United States Patent Office 3,813,278
Patented May 28, 1974

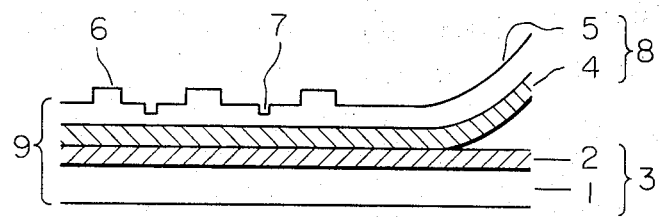

---

3,813,278
SELF-STICKING MATERIAL AND A PROCESS FOR PRODUCING THE SAME
Keizo Katagiri, Mamoru Sakaguchi, and Tokumaro Kamata, Katsuta, Japan, assignors to Nippon Kakoh Seishi K.K., Tokyo, Japan
Filed Mar. 13, 1972, Ser. No. 234,047
Int. Cl. B32b 5/02
U.S. Cl. 161—82
18 Claims

ABSTRACT OF THE DISCLOSURE

A self-sticking material comprising a base sheet (5), a film of self-sticking composition (4) comprising 100 parts, by weight, of ethylene-vinyl acetate/vinyl chloride graft polymer (known as EVA/VC) and 5 to 30 parts of a plasticizer, and a releasing paper (3) having a smooth surface. Said self-sticking material is used for preparing stickers and masking sheets and the like.

BACKGROUND OF THE INVENTION

This invention relates to a self-sticking material which can be adhered onto without any additional adhesive and peeled off from a smooth surface of an article, repeatedly, and which does not stain an adherend, and to a process for producing the same. More particularly, this invention relates to a self-sticking material comprising a base sheet, a film of self-sticking composition comprising 100 parts, by weight, of ethylene-vinyl acetate/vinyl chloride graft polymer (known as EVA/VC) and 5 to 30 parts of a plasticizer, and a releasing paper.

Various sticking materials which ordinarily comprise a base sheet, such as paper, regenerated cellulose film, a plastic film and a metal foil, and an adhesive provided thereon such as a natural and synthetic rubber and a synthetic resin, and a releasing paper, have been produced. However, such adhesives suffer from an inherent disadvantage in that rubbery adhesives have high sticking strength but are inferior in weatherability and heat durability and thus, after sticking to a material, it cannot be peeled off without leaving the adhesive on the surface of an adherend, and while a synthetic resin adhesive such as an acrylic type is superior in sticking strength and weatherability, the sticking strength increases with the passage of time and thus there is difficulty in peeling off the sticking material from the surface of an adherend and sometimes it results in breaking down. Furthermore, another disadvantage of such sticking material, which is usually in a form of roll or sheet, is cold flow of the adhesive which takes place by being forced out from the adhesive layer at the peripheral edge of the product by its own weight during transport or storage, and leads to blocking.

A sticking material has also been produced by coating a heat gelled composition comprising 100 parts, by weight, of polyvinyl chloride and 50 to 100 parts of a plasticizer on a releasing paper; its peel strength and sticking strength measured by the methods described hereinafter are only 3 to 20 g./3 cm. and 350–550 g./cm.², respectively.

Thus, such a sticking material can adhere to a smooth surface of an article, for example, a shaped synthetic resin article, or coated or painted steel, and however, the plasticizer in the sticking material migrates to the surface of the article thereby resulting in discoloration and sometimes cracking of the surface of the adherend. Furthermore, the stickiness of the sticking material varies with temperature change and decreases with the lapse of time by evaporation and migration of the plasticizer.

SUMMARY OF THE INVENTION

Accordingly, an object of this invention is to provide a self-sticking material capable of sticking to a smooth surface of an article without any additional adhesive and repeatedly sticking to and peeling off from the surface of an adherend without leaving a plasticizer. Another object is to provide a self-sticking material which does not show a tendency of blocking and/or cold flow when the self-sticking material is laid up. Another object is to provide a self-sticking material capable of sticking to a surface of steel coated or painted with an acrylic resin and of an easily plasticizer-absorbing shaped synthetic resin article including an acrylic resin, polystyrene, polycarbonate, acrylonitrile styrene resin, acrylonitrile-butadiene-styrene resin, and polyvinyl chloride; said self-sticking material does not show any evidence of migration of plasticizer in the self-sticking composition to the surface of adherend, and discoloration and cracking of the surface. Further another object is to provide a self-sticking material having improved weatherability, that is, its sticking strength does not reduce at a low temperature, while its stiffness does not change at a high temperature. Still another object is to provide a process for producing such self-sticking material.

The self-sticking material according to this invention comprises a base sheet, a film of self-sticking composition and a releasing paper bonded together in turn, and the base sheet and a film of self-sticking composition may be bonded with or without an adhesive. Depending upon the uses of the self-sticking material, the base sheet may be printed and/or embossed.

The self-sticking composition used for the self-sticking material according to this invention comprises 100 parts, by weight, of an ethylene-vinyl acetate/vinyl chloride graft polymer, 5 to 30 parts of plasticizer, and if desired, 0.5 to 5 parts of a stabilizer with or without 0.1 to 0.5 part of a lubricant. The self-sticking composition is laminated by a calender or an extruder on a releasing paper, or, alternatively, a solution of the self-sticking composition in an organic solvent is coated by a coater, such as an air-knife-, a reverse roll- or a blade coater, on a releasing paper, then a base sheet is laminated on the film of self-sticking composition, if necessary, by an adhesive. The self-sticking material thus obtained may be printed and/or embossed for a certain use, for example, a sticker and decorating purposes; however, such treatment is unnecesary for a masking sheet and protecting sheet.

The self-sticking sheet according to this invention, after removing the releasing paper, can be adhered not only to an article having a smooth surface such as glass and metal, but also to an article of an easily plasticizer-absorbing synthetic resin. If desired, the self-sticking sheet can be peeled off from and adhered to the article, repeatedly.

BRIEF DESCRIPTION OF THE DRAWING

Now, the detailed description of this invention will be described illustrating the drawing.

The accompanying drawing represents an enlarged cross-sectionally cut side view of a self-sticking material according to this invention.

In the drawing, a film of self-sticking composition 4 is laminated or coated on a releasing paper 3 having releasing layer 2 on a base paper 1. Then, with or without an adhesive the base sheet 5 is laminated on the film of self-sticking composition 4 to obtain self-sticking material 9. Patterns 6, 7 are printed and/or embossed on the base sheet 5 of a self-sticking material depending upon the uses. Afterwards, the self-sticking sheet 8 is peeled off from the releasing paper 3 and stuck to a surface of adherend.

DETAILED DESCRIPTION OF THE INVENTION

The graft polymer employed for a film of self-sticking composition 4 according to this invention is a vinyl chloride grafted ethylene-vinyl acetate copolymer and the proportions by weight of constituting units are vinyl chloride to the copolymer of 60 to 20:40 to 80, and ethylene to vinyl acetate of preferably 40 to 70:60 to 30.

The plasticizer which can be used alone or in a mixture for the self-sticking composition includes various liquid organic compounds, typical examples of which include phthalates, such as dibutyl phthalate, di-n-octyl phthalate, di-iso-octyl phthalate and di(2-ethylhexyl) phthalate; dibasic acid esters, such as di(2-ethylhexyl) adipate, di(2-ethylhexyl)sebacate, di(2-ethylhexyl)azelate; phosphates, such as tri(2-ethylhexyl) phosphate, diphenyl-2-ethyl hexyl phosphate and triphenyl phosphate; polyesters, such as polypropylene adipate and polypropylene sebacate; and butylphthalyl butyl glycolate and methylacetyl ricinolate. Such plasticizer is blended with the graft polymer in a proportion of 5 to 30 parts, by weight, for 100 parts of the graft polymer.

When the amount of plasticizer is less than specified value, the resulting self-sticking sheet 8 does not have a sufficient sticking strength, while a greater amount tends to migration of plasticizer to a surface of an article made from a plasticizer-absorbing synthetic resin onto which the self-sticking sheet is adhered.

The self-sticking sheet 8 as above mentioned has a peel strength, against the releasing paper 3, of 5 to 100 g./cm. and a sticking strength, against polished steel, of 1500 to 2500 g./3 cm.$^2$.

The self-sticking composition according to this invention may contain a heat stabilizer with or without a lubricant.

Examples of the heat stabilizer include stearates such as dibasic lead stearate, zinc, calcium and barium stearate; dibutyl tin dimaleate, dibutyl tin dilaurate and epoxidized soybean oil. Such stabilizer is blended with 100 parts, by weight, of the graft polymer in an amount of 0.5 to 5 parts. The stabilizer prevents degradation of the self-sticking composition during calender, extrusion or solution coating on a releasing paper.

Examples of the lubricant include stearyl amide, methylene bisstearyl amide, paraffine wax, stearic acid and glycerine monooleate. As metal soaps such as lead, cadmium, zinc stearate have the properties of both heat stabilization and lubrication, they are omitted from the above lubricant. The amount of such lubricant blended with the graft polymer range from 0.1 to 0.5 part, by weight, for 100 parts of the graft polymer. If said amounts are more than 0.5 part, the lubricant tends to bloom and sticking strength decreases.

The base paper 1 for the releasing paper which is employed according to this invention and onto which surface the releasing agent is applied include a smooth surfaced paper such as a one-side clay coated paper, glassine paper, parchment paper and wood free paper. The releasing agents which are employed according to this invention include a synthetic resin, such as polyethylene, polypropylene, polyvinyl alcohol and a polyamide, a saturated or unsaturated polyester resin, a ureaalkyd resin, a phenolic resin and a silicone resin. It is preferable that peel strength of such releasing agent from the self-sticking sheet 3 is less than 100 g./3 cm.

The self-sticking composition is applied to the releasing paper 3 by various means, for example by calender, extruder and coater. Where calender and extruders are employed the self-sticking composition which contains a heat stabilizer with or without a lubricant is milled or kneaded in a mill roll, and then a film of self-sticking composition of 50μ–200μ in thickness is formed at a temperature of 140° C. to 160° C. and is laminated on the releasing paper. Where a coater such as air-knife-, reverse roll- and blade coater, is employed, such self-sticking composition in a form of a solvent solution is applied to the releasing paper 3 and dried at a temperature of about 100° to 155° C. while the self-sticking composition is simultaneously gelled. Solution coating is preferable, when a film of thickness below 50μ is desired.

Examples of such solvents used in solution coating include cyclohexanone, tetrahydrofuran, dioxane, benzene, mono- and di-chlorobenzene, nitrobenzene, toluene, xylene, dimethylformamide, ethylenedichloride, trichloroethylene, tetrachloroethylene, acetone, methylethyl ketone, methyl acetate, ethyl acetate, butyl acetate and Cellosolve acetate. The amount of the solvent used for preparing the coating solution is 300 to 1000 parts, by weight, for 100 parts of the graft polymer in the self-sticking composition; less solvent results in a more viscous solution causing difficulty in the coating operation while more solvent produces a thin solution causing poor film-forming property.

The thickness of the film of self-sticking composition 4 formed on the releasing paper 3 is preferably from 10 to 200μ; thinner film is not practical in view of poor sticking strength and a film thicker than 200μ has no further advantage.

On the film of self-sticking composition 4, there is laminated a base sheet 5, such as paper, woven and non-woven fabric, synthetic paper, metal foil and synthetic resin sheet including a thermoplastic resin, such as a vinyl chloride resin, an acrylic resin, a polyamide, a polystyrene, a saturated polyester, copolymer of ethylene and vinyl acetate, copolymer of acrylonitrile and styrene, copolymer of acrylonitrile, butadiene and styrene and a thermosetting resin, such as an unsaturated polyester, polyurethane, and epoxy resin. It is preferable to select the base sheet 5 from the above-mentioned sheets to produce the self-sticking sheet 8 having below 95 of stiffness. As the result, the self-sticking sheet 8 can be easily stuck onto a surface of an adherend. In general, where paper, fabric and a resin film which have low adhesive property are employed, it is necessary to use a certain adhesive and/or special treatment e.g. surface oxidation for lamination. Such adhesives include a solution type, such as a nitrile rubber, polychloroprene, polyvinyl acetate, epoxy resin and polyurethane resin, and an emulsion type, such as ethylene/vinyl acetate copolymer and vinyl chloride/vinyl acetate copolymer and the solution type adhesive may contain a cross-linking agent such as toluene diisocyanate in order to improve adhering strength.

After the base sheet 5 is laminated on the film of self-sticking composition 4, the self-sticking material may be printed and/or embossed on the base sheet 5 by conventional means depending upon its uses.

In tables, various figures are measured as follows.

(1) Peel strength

A test sample has a dimension of 3 cm. x 15 cm. and the self-sticking sheet 8 is peeled off from the releasing paper 3 in a length of 3 cm. The self-sticking sheet and the releasing paper were fixed on upper and lower jaws, respectively, of "Tensilon" tester. Then, the self-sticking sheet and the releasing paper were peeled off at an angle of 180° and at a rate of 200 mm./min., and the load to peel off is measured.

(2) Sticking strength

From a piece of self-sticking material of 1 cm. x 6 cm., a self-sticking sheet is peeled off from the releasing paper and subjected to this test. On SUS 27 CP stainless steel plate which has been polished with an abrasive paper, washed with toluene and dried, a half part of the test piece (1 cm. x 3 cm.) is laid and pressed to the plate by means of a 1.5 kg. rubber roll which is reciprocated for once. Then, the test piece and the plate are fixed on upper and lower jaws of a "Tensilon" tester, respectively, and the test piece is pulled perpendicularly to a rate of 200 mm./min. The value of tensile shear stress obtained is the sticking strength.

(3) Stiffness

Ten pieces of 2.5 cm. x 25 cm. are cut from the self-sticking material and the self-sticking sheets 8 peeled off from the pieces are employed as test specimens. The side which was contacted with the releasing paper is put inside. By the heart-loop method in JIS L–1005 stiffness is determined. (JIS stands for Japanese Industrial Standard.)

(4) Accelerated migration of plasticizer

A self-sticking sheet 8 peeled off from the releasing paper 3 is adhered onto plastic plates, such as acrylonitrile-styrene copolymer resin, unplasticized polyvinyl chloride resin and poycarbonate resin. The thus obtained specimen is laid for a month in an atmosphere adjusted to a temperature 60° C.±2° C. After the self-sticking sheet is put away, whether the plasticizer in the self-sticking sheet migrated to the plastic plates is visually observed in respect to cloudiness, degeneration and discoloration at the adhered parts.

Three classes in the observation are as follows:

Non-remaining of the plasticizer _____ O
Traces of the plasticizer remaining _____ △
Remarkable remaining of the plasticizer _____ ✕

(5) Peeling property, sticking smear remaining on the adherend and staining thereof A self-sticking sheet 8 peeled off from the releasing paper 3 is adhered onto plastic plates, such as an acrylonitrile-styrene copolymer resin, unplasticized polyvinyl chloride resin and polycarbonate resin. The thus obtained specimens are laid for 24 hours in an oven maintained at a temperature of 60° C.±2° C. After being taken out of the oven, it is cooled an hour in the room temperature. Then, the self-sticking sheet is gently put away, at which time peeling property, reusability, the extent of sticking smear remaining on the adherend and staining of the adherend are observed visually.

(6) Blocking

The self-sticking material is cut into the size of 10 cm. x 10 cm. Ten such specimens are put together in a pile, on which a load of 175 g./cm.$^2$ is given and is laid for a month. Thereafter, each one of the specimens is peeled off successively to observe blocking, being forced out of an adhesive and also the appearance of the base sheet.

The invention is further described and illustrated by the following examples. These examples are illustrative and not limitative.

EXAMPLE 1

A self-sticking composition comprised the following ingredients:

| | Parts by weight |
|---|---|
| Graft polymer (50 parts of ethylene-vinyl acetate copolymer (27.5/22.5) grafted with 50 parts of vinyl chloride) | 100 |
| Stearic acid | 0.3 |
| Cadmium stearate | 1.0 |
| Barium stearate | 1.0 |
| Di-(2-ethylhexyl) phthalate | 15 |

The composition was kneaded in a mill roll, pressed in a calender at about 150° C. into a film of 100μ thickness and laminated on a releasing paper 3 having a layer 10μ thick of an unsaturated polyester resin. Then, onto the film of self-sticking composition 4, an aqueous acrylic adhesive was coated by a reverse roll coater, and an art paper of 100μ thickness was laminated to obtain a self-sticking material. The obtained self-sticking material was printed on the art paper.

EXAMPLE 2

A self-sticking composition comprised the following ingredients:

| | Parts by weight |
|---|---|
| Graft polymer (50 parts of ethylene-vinyl acetate copolymer (35/15) grafted with 50 parts of vinyl chloride) | 100 |
| Lead stearate | 0.4 |
| Cadmium stearate | 1.5 |
| "Epocizer" P–206 (epoxidized soybean oil available from Nihon Reichhold Kabushiki Kaisha) | 3.0 |
| Di(2-ethylhexyl) phthalate | 20 |

The composition was extruded through a T-die extruder at 150° C. in a film of 100μ thickness on a releasing paper 3 having a polyethylene layer of 17μ thickness. Then, polyvinyl chloride sheet having following composition was laminated on the film of a self-sticking composition 4.

| | Parts by weight |
|---|---|
| Polyvinyl chloride (D.P.=1050) | 100 |
| Stearic acid | 0.1 |
| Dibutyl tin dilaurate | 2.0 |
| Diisooctyl phthalate | 10 |

The obtained self-sticking material was printed and embossed on the polyvinyl chloride sheet.

EXAMPLE 3

A self-sticking composition was prepared from the following ingredients:

| | Parts by weight |
|---|---|
| Graft polymer (65 parts of ethylene-vinyl acetate copolymer (26/39) grafted with 35 parts of vinyl chloride) | 100 |
| Glycerine monooleate | 0.3 |
| Dibasic lead phthalate | 1.5 |
| Barium stearate | 1.5 |
| Di-2-ethylhexyl phthalate | 20.0 |

The composition was kneaded in a mill roll, pressed in a calender at about 150° C. into a film of 100μ thickness and laminated on a releasing paper which has been coated with polyvinyl alcohol of 20μ on a clay coated paper. Then, a 250μ woven fabric was bonded on the film of self-sticking composition by ethylene-vinyl acetate copolymer emulsion to obtain a self-sticking material. The obtained self-sticking material was printed on a woven fabric.

EXAMPLE 4

A self-sticking composition was prepared from the following ingredients:

| | Parts by weight |
|---|---|
| Graft polymer (55 parts of ethylene-vinyl acetate copolymer (33/22) grafted with 45 parts of vinyl choride) | 100 |
| Zinc stearate | 0.5 |
| Dibutyl tin dilaurate | 2.0 |
| "Epocizer" P–206 (epoxidized soybean oil) | 3.0 |
| Di-2-ethylhexyl phthalate | 20.0 |

The composition was kneaded in a mill roll, pressed in a calender at 140° C. into a film of 80μ thickness and laminated on a releasing paper coated with an unsaturated polyester resin of 10μ on the clay coated paper. Then, onto the film of self-sticking composition, an adhesive comprising acrylic resin modified with isocyanate was coated by a doctor knife coater followed by bonding a regenerated cellulose sheet to obtain a self-sticking material.

EXAMPLE 5

A self-sticking composition was prepared from the following ingredients:

| | Parts by weight |
|---|---|
| Graft polymer (40 parts of ethylene-vinyl acetate copolymer (20/20) grafted with 60 parts of vinyl chloride) | 100 |
| Paraffin wax | 0.5 |
| "Mark" AC 101 (stabilizer) | 2.0 |
| Di-2-ethylhexyl phthalate | 20.0 |

The composition was kneaded in a mill roll, pressed in a calender at about 160° C. into a film of 60μ thickness and laminated on a releasing paper with polypropylene of 70μ thickness. Then, onto the film of self-sticking composition, an acrylonitrile-butadiene rubber adhesive was coated in a thickness of 50μ, followed by laminating a thermoplastic polyester of 50μ thickness to obtain a self-sticking material.

EXAMPLE 6

A coating solution was obtained from the following ingredients:

| | Parts by weight |
|---|---|
| Graft polymer (50 parts of ethylene-vinyl acetate copolymer (27.5/22.5) grafted with 50 parts of vinyl chloride) | 100 |
| KS–23 (stabilizer available from Kyodo Yakuhin Kabushiki Kaisha) | 3 |
| Di-n-octyl phthalate | 15 |
| Tetrahydrofuran | 700 |
| Methylethyl ketone | 300 |

The coating solution was applied by a reverse roll coater on a releasing paper coated with an unsaturated polyester resin of 20μ thickness and dried at 140° C. to form a film of 150μ thickness of self-sticking composition. Then polystyrene sheet of 100μ thickness was laminated through an ethylene-vinylacetate copolymer adhesive on the film of self-sticking composition to obtain a self-sticking material.

EXAMPLE 7

A coating solution comprising the following ingredients was prepared.

| | Parts by weight |
|---|---|
| Graft polymer (55 parts of ethylene-vinyl acetate copolymer (33/22) grafted with 45 parts of vinyl chloride) | 100 |
| Di-n-octyl phthalate | 20.0 |
| Cyclohexanone | 400 |
| Ethyl acetate | 400 |

The solution was coated by a knife coater on a releasing paper coated with an epoxy resin of 15μ thickness and dried at a temperature 130° C. to evaporate the solvent and to gel the composition thereby forming a film 50μ thick of self-sticking composition. Then, a sheet 100μ thick of ethylene-vinyl acetate copolymer was laminated on the film of self-sticking composition to obtain a self-sticking material. The obtained self-sticking material was printed.

EXAMPLE 8

A self-sticking composition was prepared from the following ingredients:

| | Parts by weight |
|---|---|
| Graft polymer (80 parts of ethylene-vinyl acetate copolymer (44/36) grafted with 20 parts of vinyl chloride) | 100 |
| Stearic acid | 0.3 |
| "Mark" AC 101 (Adeka Argus Chemical Co.) | 2.0 |
| "Epocizer" P–206 | 2.0 |
| Diisooctyl phthalate | 20.0 |

Onto a releasing paper having a layer 20μ thick of unsaturated polyester resin, the composition was calender-laminated at 150° C. in a thickness of 100μ followed by laminating a 100μ thick polyvinyl chloride sheet comprising the following ingredients. The obtained self-sticking material was printed and embossed.

| | Parts by weight |
|---|---|
| Polyvinyl chloride (D.P.=1000) | 100 |
| Stearic acid | 0.3 |
| Barium stearate | 1.5 |
| "Epocizer" P–206 | 3.0 |
| Di-n-octyl phthalate | 25.0 |

COMPARATIVE EXAMPLE 1

A composition was prepared from the following ingredients:

| | Parts by weight |
|---|---|
| Polyvinyl chloride (D.P.=1050) | 100 |
| Dibutyl tin dilaurate | 2.0 |
| Cadmium stearate | 0.3 |
| Barium stearate | 0.2 |
| Di-2-ethylhexyl phthalate | 60.0 |

The composition was kneaded in a mill roll, pressed in a calender at 155° C. into a sheet of 250μ thickness and laminated on a releasing paper having an unsaturated polyester layer of 10μ thickness to obtain a sticking material. The obtained sticking material was printed.

COMPARATIVE EXAMPLE 2

An adhesive composition was prepared from the following ingredients:

| | Parts by weight |
|---|---|
| Butylacrylate-acrylic acid (80:20) copolymer | 340 |
| Trimethylol propane | 25 |
| β-Toluene sulfonic acid | 0.03 |

The composition was coated by reverse roll coater in an amount of 25 g./m.² on a releasing paper having a layer 5μ thick of silicone resin and heated in an oven at 110° C. for 2 minutes. Then, a thermoplastic polyester sheet of 50μ thickness was laminated on the composition to obtain a sticking material.

COMPARATIVE EXAMPLE 3

An adhesive composition was prepared from the following ingredients

| | Parts by weight |
|---|---|
| Natural rubber | 60 |
| SBR 1502 (styrene-butadiene-rubber) | 40 |
| Phenolic resin | 15 |
| Poly-β-pinene | 65 |
| Aluminum isopropoxide | 5 |
| Antioxidant | 3 |
| Benzene | 900 |

The composition was coated by a roll coater in an amount of 20 g./m.² on a releasing paper having a layer 17μ thick of an unsaturated polyester resin and heated in an oven at 100° C. for 3 minutes. Then, regenerated cellulose film of 40μ thickness was laminated on the composition to obtain a sticking material.

Hereinbelow will be given a further explanation in supplementation of the migration of a plasticizer, blocking, sticking smear to remain on the surface of adherend after peeling off and so forth.

Table 1 illustrates the result of the accelerated migration of a plasticizer at 60°±2° C.

TABLE 1.—RESULTS OF THE ACCELERATED MIGRATION OF A PLASTICIZER

| Adherend | Self sticking sheet | 1st day | 3d day | 5th day | 10th day | 15th day | 30th day |
|---|---|---|---|---|---|---|---|
| Acrylonitrilestyrene plate | Example 1 | O | O | O | O | O | O |
| | Example 2 | O | O | O | O | O | O |
| | Comparative example 1 | X | X | X | X | X | X |
| | Comparative example 2 | X | X | X | X | X | X |
| | Comparative example 3 | X | X | X | X | X | X |
| Polyvinyl chloride plate (hard) | Example 1 | O | O | O | O | O | O |
| | Example 2 | O | O | O | O | O | O |
| | Comparative example 1 | X | X | X | X | X | X |
| | Comparative example 2 | X | X | X | X | X | X |
| | Comparative example 3 | X | X | X | X | X | X |
| Polycarbonate plate | Example 1 | O | O | O | O | O | O |
| | Example 2 | O | O | O | O | O | O |
| | Comparative example 1 | X | X | X | X | X | X |
| | Comparative example 2 | X | X | X | X | X | X |
| | Comparative example 3 | X | X | X | X | X | X |

Examples 3, 4, 5, 6, 7 and 8 were the same result as Examples 1 and 2.

Table 2 illustrates the results of the migration of a plasticizer, sticking smear to remain on a surface of an adherend and also on the feasibility of reusing the self-sticking sheet.

TABLE 2.—TEST RESULTS ON THE INFLUENCE OF THE SELF-STICKING SHEET ON THE ADHERENDS

| Adherend | Sticking sheet | Migration of a plasticizer onto the adherend | Sticking smear | Peeling property after being stuck |
|---|---|---|---|---|
| Acrylonitrile-styrene plate | Example 1 | No migration | No sticking smear remained | Easily peelable, reusable. |
| | Example 2 | do | do | Do. |
| | Comparative example 1 | Remarkable migration | do | Do. |
| | Comparative example 2 | do | Sticking smear remained | Peeling impossible. |
| | Comparative example 3 | No migration | do | Do. |
| Vinyl chloride plate (hard) | Example 1 | No migration | No sticking smear remained | Easily peelable, reusable. |
| | Example 2 | do | do | Do. |
| | Comparative example 1 | Remarkable migration | do | Do. |
| | Comparative example 2 | do | Sticking smear remained | Peeling impossible. |
| | Comparative example 3 | No migration | do | Do. |
| Polycarbonate plate | Example 1 | No migration | No sticking smear remained | Easily peelable, reusable. |
| | Example 2 | do | do | Do. |
| | Comparative example 1 | Remarkable migration | do | Do. |
| | Comparative example 2 | do | Sticking smear remained | Peeling impossible. |
| | Comparative example 3 | No migration | do | Do. |

Table 3 illustrates the results of blocking under a load at 20° C.

| Example number | Blocking | Forcing out of a self-sticking agent |
|---|---|---|
| Example: | | |
| 1 | None | None. |
| 2 | do | Do. |
| Comparative example: | | |
| 1 | do | Forced out. |
| 2 | do | Do. |
| 3 | do | None. |

Examples 3, 4, 5, 6, 7 and 8 were the same results as Examples 1 and 2.

Table 4 illustrates the results of peeling strength, sticking strength and stiffness at a temperature of 20° C.±2° C.

TABLE 4.—THE RESULTS OF PEELING STRENGTH, STICKING STRENGTH AND STIFFNESS

| Example number | Peeling strength against a releasing layer of releasing paper (g./3 cm.) | Sticking strength against steel plate (g./3 cm.¹) | Stiffness of self-sticking sheet (mm.) |
|---|---|---|---|
| Example: | | | |
| 1 | 30 | 2,000 | 39 |
| 2 | 50 | 2,500 | 80 |
| 3 | 85 | 2,650 | 85 |
| 4 | 25 | 2,200 | 81 |
| 5 | 29 | 2,300 | 75 |
| 6 | 70 | 2,200 | 40 |
| 7 | 32 | 2,700 | 80 |
| 8 | 18 | 2,100 | 84 |
| Comparative example: | | | |
| 1 | 5 | 500 | 100 |
| 2 | 20 | >5,000 | |
| 3 | 35 | >5,000 | |

We claim:
1. A self-sticking material which comprises a base sheet, a film of self-sticking composition comprising 100 parts, by weight, of an ethylene-vinyl acetate/vinyl chloride graft polymer and 5 to 30 parts of a plasticizer, and a releasing paper having a smooth surface.

2. A self-sticking material which comprises a base sheet, a film of a self-sticking composition comprising 100 parts, by weight, of an ethylene-vinyl acetate/vinyl chloride graft polymer, 5 to 30 parts of a plasticizer and 0.5 to 5 parts of a stabilizer, and a releasing paper having a smooth surface.

3. A self-sticking material which comprises a base sheet, a film of a self-sticking composition comprising 100 parts, by weight, of an ethylene-vinyl acetate/vinyl chloride graft polymer, 5 to 30 parts of a plasticizer, 0.5 to 5 parts of a stabilizer and 0.1 to 0.5 part of a lubricant, and a releasing paper having a smooth surface.

4. A self-sticking material according to claim 1, wherein said graft polymer consists of 60 to 20%, by weight, of vinyl chloride units and 40 to 80% of ethylene-vinyl acetate copolymer units.

5. A self-sticking material according to claim 1, wherein said base sheet is selected from the group consisting of paper, synthetic paper, regenerated cellulose film, woven and non-woven fabric, metal foil, and a synthetic resin sheet including a thermoplastic resin, such as a polyvinyl chloride, polyethylene, polypropylene, acrylic resin, polyamide, polystyrene, saturated polyester, copolymer of ethylene and vinyl acetate, copolymer of acrylonitrile and styrene, copolymer of acrylonitrile, butadiene and styrene and a thermosetting resin, such as an unsaturated polyester, polyurethane, and an epoxy resin.

6. A self-sticking material according to claim 1, wherein said releasing paper is coated with a releasing agent selected from the group consisting of a polyethylene, a polypropylene, a polyvinyl alcohol, a polyamide, a silicone resin, an unsaturated polyester resin, an unsaturated polyester resin, a phenolic resin, and a urea-alkyd resin.

7. A self-sticking material according to claim 1, wherein said plasticizer is selected from the group consisting of dibutyl phthalate, di-n-octyl phthalate, di-2-ethylhexyl phthalate, diisooctyl phthalate, di-2-ethylhexyl adipate, di-2-ethylhexyl-sebacate, tri-2-ethylhexyl phosphate, diphenyl 2-ethylhexyl phosphate, methylacetyl ricinolate, butylphthalyl butylglycolate, polypropylene adipate, and polypropylene sebacate.

8. A self-sticking material according to claim 1, wherein said base sheet is printed.

9. A self-sticking material according to claim 1, wherein said base sheet is embossed.

10. A self-sticking material according to claim 1, wherein said base sheet is printed and embossed.

11. A process for producing a self-sticking material which comprises coating a solution comprising 100 parts, by weight, of an ethylenevinyl acetate/vinyl chloride graft polymer, 5 to 30 parts of a plasticizer and 300 to 1000 parts of solvent on a releasing paper and drying the resulting coated paper to obtain a film of self-sticking composition onto which a base sheet is laminated.

12. A process for producing a self-sticking material which comprises coating a solution comprising 100 parts, by weight, of an ethylenevinyl acetate/vinyl chloride graft polymer, 5 to 30 parts of a plasticizer, 0.5 to 5 parts of a stabilizer and 300 to 1000 parts of solvent on a releasing paper and drying the resulting coated paper to obtain a film of self-sticking composition onto which a base sheet is laminated.

13. A process for producing a self-sticking material which comprises laminating a film of a self-sticking composition comprising 100 parts, by weight, of an ethylenevinyl acetate/vinyl chloride graft polymer, 5 to 30 parts of a plasticizer, 0.5 to 5 parts of a stabilizer with or without 0.1 to 0.5 parts of a lubricant on a releasing paper to form a film of a self-sticking composition onto which a base sheet is laminated.

14. A process for producing a self-sticking material according to claim 11, wherein said graft polymer consists of 60 to 20%, by weight, of vinyl chloride units and 40 to 80% of ethylene-vinyl acetate copolymer units.

15. A process for producing a self-sticking material according to claim 11, wherein said solvent is selected from the group consisting of cyclohexanone, tetrahydrofuran, monochloro benzene, dichloro benzene, nitrobenzene, benzene, toluene, xylene, dioxane, dimethyl formamide, ethylene dichloride, trichloro ethylene, tetrachloroethylene, acetone, methylethyl ketone, methyl acetate, ethyl acetate, butyl acetate and Cellosolve acetate.

16. A process for producing a self-sticking material according to claim 12, wherein said graft polymer consists of 60 to 20%, by weight, of vinyl chloride units and 40 to 80% of ethylene-vinyl acetate copolymer units.

17. A process for producing a self-sticking material according to claim 13, wherein said graft polymer consists of 60 to 20%, by weight, of vinyl chloride units and 40 to 80% of ethylene-vinyl acetate copolymer units.

18. A process for producing a self-sticking material according to claim 12 wherein said solvent is selected from the group consisting of cyclohexanone, tetrahydrofuran, monochloro benzene, dichloro benzene, nitrobenzene, benzene, toluene, xylene, dioxane, dimethyl formamide, ethylene dichloride, trichloro ethylene, tetrachloro ethylene, acetone, methylethyl ketone, methylacetate, ethyl acetate, butyl acetate and Collosolve acetate.

References Cited
UNITED STATES PATENTS

| | | | |
|---|---|---|---|
| 2,648,924 | 8/1953 | Brewster | 161—406 |
| 3,130,113 | 4/1964 | Silman | 161—406 |
| 3,111,449 | 11/1963 | Gold et al. | 161—406 |
| 3,471,357 | 10/1969 | Bildusas | 161—406 |
| 3,305,606 | 2/1967 | Hardt et al. | 260—878 R |

GEORGE F. LESMES, Primary Examiner

J. J. BELL, Assistant Examiner

U.S. Cl. X.R.

117—122 P, 122 PA; 161—88, 97, 151, 167, 213, 247, 270, 406; 260—30.6, 31.6, 31.8, 878